(12) United States Patent
Ruan et al.

(10) Patent No.: US 9,847,929 B2
(45) Date of Patent: Dec. 19, 2017

(54) CLUSTER AND FORWARDING METHOD

(71) Applicant: Huawei Technologies Co., Ltd., Shenzhen (CN)

(72) Inventors: Qiangsheng Ruan, Beijing (CN); Dayong Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 14/797,886

(22) Filed: Jul. 13, 2015

(65) Prior Publication Data

US 2015/0319074 A1 Nov. 5, 2015

Related U.S. Application Data

(63) Continuation of application No. PCT/CN2013/070433, filed on Jan. 14, 2013.

(51) Int. Cl.
*H04L 12/28* (2006.01)
*H04L 12/715* (2013.01)
(Continued)

(52) U.S. Cl.
CPC .......... *H04L 45/04* (2013.01); *H04L 12/6418* (2013.01); *H04L 45/34* (2013.01);
(Continued)

(58) Field of Classification Search
CPC ................................ H04L 45/04; H04L 45/34
(Continued)

(56) References Cited

U.S. PATENT DOCUMENTS 7,602,717 B1 * 10/2009 Shenoy ............... H04L 12/5601
370/235
7,817,542 B2 * 10/2010 Xiong .................... H04L 45/02
370/228
(Continued)

FOREIGN PATENT DOCUMENTS

| CN | 1602089 A | 3/2005 |
|---|---|---|
| CN | 1612562 A | 5/2005 |

(Continued)

OTHER PUBLICATIONS

Brocade, "Introducing Brocade VCS Technology," White Paper, www.brocade.com, © 2010 Brocade Communications Systems, Inc., pp. 1-12.

(Continued)

*Primary Examiner* — Farah Faroul
(74) *Attorney, Agent, or Firm* — Slater Matsil, LLP

(57) ABSTRACT

Embodiments of the present invention provide a cluster that includes a first node and a second node, and the first node and the second node are configured to cooperatively perform a forwarding service on a first packet, where the first node is configured to receive the first packet by using an inbound interface and determine the inbound interface; and the second node is configured to determine an outbound interface according to a forwarding table corresponding to the forwarding service and forward the first packet by using the outbound interface of the second node. In addition, the embodiments of the present invention further provide other clusters and forwarding methods. The foregoing technical solutions help to reduce software and hardware resources occupied by a cluster.

14 Claims, 7 Drawing Sheets

(51) Int. Cl.
*H04L 12/721* (2013.01)
*H04L 12/741* (2013.01)
*H04L 29/06* (2006.01)
*H04L 12/64* (2006.01)
*H04L 12/775* (2013.01)

(52) U.S. Cl.
CPC ............ *H04L 45/58* (2013.01); *H04L 45/745* (2013.01); *H04L 69/22* (2013.01)

(58) Field of Classification Search
USPC .................................................. 370/389, 392
See application file for complete search history.

(56) References Cited

U.S. PATENT DOCUMENTS

| | | |
|---|---|---|
| 2009/0282116 A1 | 11/2009 | Hammons et al. |
| 2011/0085558 A1 | 4/2011 | Gnanasekaran et al. |
| 2011/0268125 A1 | 11/2011 | Vobbilisetty et al. |
| 2011/0274110 A1* | 11/2011 | Mmmadi ................ H04L 49/30 370/392 |
| 2011/0286342 A1 | 11/2011 | Ee et al. |
| 2011/0286357 A1 | 11/2011 | Haris et al. |
| 2011/0286452 A1 | 11/2011 | Balus et al. |
| 2011/0289252 A1 | 11/2011 | Hoese et al. |
| 2011/0289295 A1 | 11/2011 | Chen et al. |
| 2011/0292933 A1 | 12/2011 | Rodriguez Perez et al. |
| 2011/0292937 A1 | 12/2011 | Gupta et al. |
| 2011/0292939 A1 | 12/2011 | Subramaian et al. |
| 2011/0292942 A1 | 12/2011 | Imai |
| 2011/0292947 A1 | 12/2011 | Vobbilisetty et al. |
| 2011/0299391 A1 | 12/2011 | Vobbilisetty et al. |
| 2011/0299402 A1 | 12/2011 | Vobbilisetty et al. |
| 2011/0299413 A1 | 12/2011 | Chatwani et al. |
| 2011/0299534 A1 | 12/2011 | Koganti et al. |
| 2011/0299535 A1 | 12/2011 | Vobbilisetty et al. |
| 2011/0301970 A1 | 12/2011 | Bae et al. |
| 2012/0120949 A1* | 5/2012 | Raghuraman ............ H04L 45/04 370/389 |
| 2012/0131216 A1* | 5/2012 | Jain ........................ H04L 45/24 709/230 |
| 2013/0044764 A1* | 2/2013 | Casado ................... H04L 12/66 370/401 |
| 2013/0047026 A1 | 2/2013 | Szabo et al. |
| 2013/0064075 A1* | 3/2013 | Pu ........................ H04L 12/4641 370/225 |
| 2014/0006660 A1* | 1/2014 | Frei ..................... H04L 29/1249 710/104 |
| 2015/0271103 A1* | 9/2015 | Thayalan ................ H04L 49/25 370/217 |

FOREIGN PATENT DOCUMENTS

| | | |
|---|---|---|
| CN | 1713586 A | 12/2005 |
| CN | 1988498 A | 6/2007 |
| CN | 101931587 A | 12/2010 |
| CN | 102124697 A | 7/2011 |
| CN | 102137017 A | 7/2011 |

OTHER PUBLICATIONS

IEEE, "Virtual Bridged Local Area Networks-Port Extenders," IEEE P802.1BR/D2.2, Sep. 1, 2011, 140 pages.

Touch, J., et al., "Transparent Interconnection of Lots of Links (TRILL): Problem and Applicability Statement," Network Working Group Request for Comments 5556, May 2009, 35 pages.

Perlman, R., et al., "Routing Bridges (RBridges): Base Protocol Specification," Internet Engineering Task Force (IETF) Request for Comments 6325, Jul. 2011, 199 pages.

Eastlake, D., et al., "Transparent Interconnection of Lots of Links (TRILL) Use of IS-IS," Internet Engineering Task Force (IETF) Request for Comments 6326, Jul. 2011, 51 pages.

Eastlake, D., et al., "Routing Bridges (RBridges): Adjacency," Internet Engineering Task Force (IETF) Request for Comments 6327, Jul. 2011, 53 pages.

Carlson, J., et al., "PPP Transparent Interconnection of Lots of Links (TRILL) Protocol: Control Protocol," Internet Engineering Task Force (IETF) Request for Comments 6361, Aug. 2011, 17 pages.

Schmutzer, C., "nV Technology," Cisco Expo 2012, Serbia, 24 pages.

* cited by examiner

CLUSTER AND FORWARDING METHOD

This application is a continuation of International Application No. PCT/CN2013/070433, filed on Jan. 14, 2013, which is hereby incorporated by reference in its entirety.

TECHNICAL FIELD

The present invention relates to the communications field, and in particular, to a cluster and a forwarding method.

BACKGROUND

With rapid development of an Internet Protocol (IP) network, a capacity and the number of users of an IP bearer network are increasing constantly and rapidly, thereby imposing an increasingly high network bandwidth requirement. In order to meet the increasingly high network bandwidth requirement, a cluster technology is generated. By using the cluster technology, multiple network devices may be externally presented as only one network device. A cluster may be used to perform a forwarding service.

In the prior art, after receiving a packet, a network device in a cluster can determine, by searching for a forwarding table, an outbound interface used to forward the packet. The cluster occupies more software and hardware resources.

SUMMARY

In order to reduce occupation of software and hardware resources, embodiments of the present invention provide a cluster and a forwarding method.

According to a first aspect, a cluster is provided, including a first node and a second node, where:

the first node and the second node are configured to cooperatively perform a forwarding service on a first packet, where the first node is configured to receive the first packet by using an inbound interface and determine the inbound interface; and the second node is configured to determine an outbound interface according to a forwarding table corresponding to the forwarding service and forward the first packet by using the outbound interface of the second node.

In the foregoing technical solution, the second node determines the outbound interface and forwards the first packet by using the outbound interface. Therefore, the first node does not need to maintain the forwarding table, nor need to determine the outbound interface by searching for the forwarding table. Maintaining the forwarding table and searching for the forwarding table need to occupy software and hardware resources. Therefore, the foregoing technical solution helps to reduce software and hardware resources occupied by the cluster.

In a first possible implementation manner of the cluster provided in the first aspect, the first node further includes an encapsulation circuit and a first sending circuit, where:

the encapsulation circuit is configured to encapsulate the first packet to generate a second packet, where the second packet includes an identifier of the inbound interface; and the first sending circuit is configured to send the second packet generated by the encapsulation circuit to the second node.

According to the cluster provided in the first aspect, or the first possible implementation manner of the cluster provided in the first aspect, in a second possible implementation manner of the cluster provided in the first aspect, the second node specifically includes a receiving circuit, a decapsulation circuit, a determining unit, and a second sending circuit, where:

the receiving circuit is configured to receive the second packet sent from the first sending circuit;

the decapsulation circuit is configured to decapsulate the second packet to generate the first packet;

the determining unit is configured to determine a type of the forwarding service and the forwarding table according to the identifier of the inbound interface; determine a field in a packet header of the second packet according to the type of the forwarding service; and determine an identifier of the outbound interface according to the field and the forwarding table; and the second sending circuit is configured to send, by using the outbound interface corresponding to the identifier of the outbound interface that is determined by the determining unit, the first packet generated by the decapsulation circuit.

According to a second aspect, a cluster is provided, including a first node, a second node, and a third node, where:

the first node, the second node, and the third node are configured to cooperatively perform a forwarding service on a first packet, where the first node is configured to receive the first packet by using an inbound interface and determine the inbound interface; the second node is configured to determine the third node and an outbound interface according to a forwarding table corresponding to the forwarding service; and the third node is configured to forward the first packet by using the outbound interface of the third node.

In the foregoing technical solution, the second node determines the third node and the outbound interface. The third node forwards the first packet by using the outbound interface. Therefore, the first node and the third node do not need to maintain the forwarding table, nor need to determine the outbound interface by searching for the forwarding table. Maintaining the forwarding table and searching for the forwarding table need to occupy software and hardware resources. Therefore, the foregoing technical solution helps to reduce software and hardware resources occupied by the cluster.

In a first possible implementation manner of the cluster provided in the second aspect, the first node further includes a first encapsulation circuit and a first sending circuit, where:

the first encapsulation circuit is configured to encapsulate the first packet to obtain a second packet, where the second packet includes an identifier of the inbound interface; and the first sending circuit is configured to send the second packet generated by the first encapsulation circuit to the second node.

According to the cluster provided in the second aspect, or the first possible implementation manner of the cluster provided in the second aspect, in a second possible implementation manner of the cluster provided in the second aspect, the second node specifically includes a first receiving circuit, a first determining unit, a second encapsulation circuit, and a second sending circuit, where:

the first receiving circuit is configured to receive the second packet sent from the first sending circuit;

the first determining unit is configured to determine a type of the forwarding service and the forwarding table according to the identifier of the inbound interface; determine a field in a packet header of the second packet according to the type of the forwarding service; and determine the third node and an identifier of the outbound interface according to the field and the forwarding table;

the second encapsulation circuit is configured to encapsulate the first packet in the second packet to generate a third packet, where the third packet includes the identifier of the outbound interface; and the second sending circuit is configured to send the third packet generated by the second encapsulation circuit to the third node determined by the first determining unit.

According to the cluster provided in the second aspect, the first possible implementation manner of the cluster provided in the second aspect, or the second possible implementation manner of the cluster provided in the second aspect, in a third possible implementation manner of the cluster provided in the second aspect, the third node specifically includes a second receiving circuit, a second determining unit, a decapsulation circuit, and a third sending circuit, where:

the second receiving circuit is configured to receive the third packet sent from the second sending circuit;

the decapsulation circuit is configured to decapsulate the third packet to generate the first packet;

the second determining unit is configured to determine the outbound interface according to the identifier of the outbound interface that is in the third packet received by the second receiving circuit; and the third sending circuit is configured to send, by using the outbound interface determined by the second determining unit, the first packet generated by the decapsulation circuit.

According to a third aspect, a forwarding method is provided, including:

cooperatively performing, by a first node and a second node in a cluster, a forwarding service on a first packet, where the first node receives the first packet by using an inbound interface and determines the inbound interface; and the second node determines an outbound interface according to a forwarding table corresponding to the forwarding service and forwards the first packet by using the outbound interface of the second node.

In the foregoing technical solution, the second node determines the outbound interface and forwards the first packet by using the outbound interface. Therefore, the first node does not need to maintain the forwarding table, nor need to determine the outbound interface by searching for the forwarding table. Maintaining the forwarding table and searching for the forwarding table need to occupy software and hardware resources. Therefore, the foregoing technical solution helps to reduce software and hardware resources occupied by the cluster.

In a first possible implementation manner of the forwarding method provided in the third aspect, after the first node determines the inbound interface, the method further includes:

encapsulating, by the first node, the first packet to generate a second packet, where the second packet includes an identifier of the inbound interface; and sending, by the first node, the second packet to the second node.

According to the forwarding method provided in the third aspect, or the first possible implementation manner of the forwarding method provided in the third aspect, in a second possible implementation manner of the forwarding method provided in the third aspect, the determining the outbound interface by the second node specifically includes:

receiving, by the second node, the second packet sent from the first node;

decapsulating, by the second node, the second packet to generate the first packet; and determining, by the second node, a type of the forwarding service and the forwarding table according to the identifier of the inbound interface, determining a field in a packet header of the second packet according to the type of the forwarding service, and determining an identifier of the outbound interface according to the field and the forwarding table; and the forwarding the first packet by the second node specifically includes:

sending, by the second node, the first packet by using the outbound interface corresponding to the identifier of the outbound interface.

According to a fourth aspect, a forwarding method is provided, including:

cooperatively performing, by a first node, a second node, and a third node in a cluster, a forwarding service on a first packet, where the first node receives the first packet by using an inbound interface and determines the inbound interface; the second node determines the third node and an outbound interface according to a forwarding table corresponding to the forwarding service; and the third node forwards the first packet by using the outbound interface of the third node.

In a first possible implementation manner of the forwarding method provided in the fourth aspect, after the first node determines the inbound interface, the method further includes:

encapsulating, by the first node, the first packet to obtain a second packet, where the second packet includes an identifier of the inbound interface; and sending, by the first node, the second packet to the second node.

According to the forwarding method provided in the fourth aspect, or the first possible implementation manner of the forwarding method provided in the fourth aspect, in a second possible implementation manner of the forwarding method provided in the fourth aspect, the determining the third node and the outbound interface by the second node specifically includes:

receiving the second packet by the second node;

determining, by the second node, a type of the forwarding service and the forwarding table according to the identifier of the inbound interface, determining a field in a packet header of the second packet according to the type of the forwarding service, and determining the third node and an identifier of the outbound interface according to the field and the forwarding table;

encapsulating, by the second node, the first packet in the second packet to generate a third packet, where the third packet includes the identifier of the outbound interface; and sending, by the second node, the third packet to the third node.

According to the forwarding method provided in the fourth aspect, the first possible implementation manner of the forwarding method provided in the fourth aspect, or the second possible implementation manner of the forwarding method provided in the fourth aspect, in a third possible implementation manner of the forwarding method provided in the fourth aspect, the forwarding the first packet by the third node specifically includes:

receiving the third packet by the third node;

decapsulating, by the third node, the third packet to generate the first packet;

determining, by the third node, the outbound interface according to the identifier of the outbound interface that is in the third packet; and sending, by the third node, the first packet by using the outbound interface.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A person skilled in the art may understand that a cluster includes multiple network apparatuses. The cluster is externally presented as only one network apparatus. For example, the cluster may be externally presented as having only one IP address. The cluster may be externally presented as having only one media access control (Media Access Control, MAC) protocol address.

Figure 1:
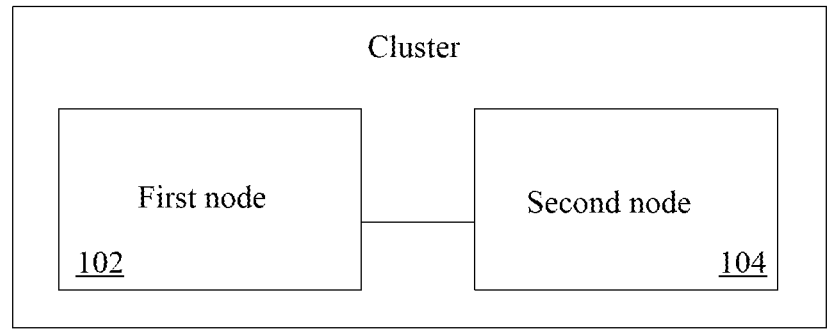
FIG. 1 is a schematic structural diagram of a cluster according to an embodiment of the present invention.

FIG. 1 is a schematic structural diagram of a cluster according to an embodiment of the present invention. Referring to FIG. 1, the cluster includes a first node 102 and a second node 104.

The first node 102 and the second node 104 are configured to cooperatively perform a forwarding service on a first packet, where the first node 102 is configured to receive the first packet by using an inbound interface and determine the inbound interface; and the second node 104 is configured to determine an outbound interface according to a forwarding table corresponding to the forwarding service and forward the first packet by using the outbound interface of the second node 104.

For example, the first node 102 may be a router, a switch, a packet transport network (packet transport network, PTN) device, a firewall, a broadband remote access server (broadband remote access server, BRAS), or a load balancer.

For example, the second node 104 may be a router, a switch, a PTN device, a firewall, a BRAS, or a load balancer.

For example, the forwarding service may be a layer 2 forwarding service, a layer 3 forwarding service, a layer 4 forwarding service, a Multiprotocol Label Switching (Multiprotocol Label Switching, MPLS) forwarding service, or a virtual private network (virtual private network, VPN) forwarding service. The layer 2 forwarding service may be a MAC protocol forwarding service. The layer 3 forwarding service may be an IP forwarding service. The layer 4 forwarding service may be a Transmission Control Protocol (Transmission Control Protocol, TCP) forwarding service. The VPN forwarding service may be a layer 2 virtual private network (Layer 2 virtual private network, L2VPN) forwarding service or a layer 3 virtual private network (Layer 3 virtual private network, L3VPN) forwarding service.

For example, the forwarding table may be a routing table or a MAC protocol table.

For example, the first packet may be a MAC protocol packet, an IP packet, a TCP packet, or a User Datagram Protocol (User Datagram Protocol, UDP) packet.

For example, the determining the outbound interface according to the forwarding table may be specifically: if the first packet is an IP packet, determining, according to a destination IP address in the first packet, a routing entry that is in a routing table and matches the destination IP address. The routing entry includes an identifier of the outbound interface.

For example, the determining the outbound interface according to the forwarding table may be specifically: if the first packet is a MAC protocol packet, determining, according to a destination MAC protocol address in the first packet, a MAC protocol entry that is in a MAC protocol table and matches the destination MAC protocol address. The MAC protocol entry includes an identifier of the outbound interface.

In the foregoing technical solution, the second node determines the outbound interface and forwards the first packet by using the outbound interface. Therefore, the first node does not need to maintain the forwarding table, nor need to determine the outbound interface by searching for the forwarding table. Maintaining the forwarding table and searching for the forwarding table need to occupy software and hardware resources. Therefore, the foregoing technical solution helps to reduce software and hardware resources occupied by the cluster.

Optionally, in the cluster shown in FIG. 1, the second node 104 is specifically configured to determine the outbound interface according to the forwarding table and the inbound interface.

Optionally, in the cluster shown in FIG. 1, the first node 102 further includes an encapsulation circuit 106 and a first sending circuit 108.

The encapsulation circuit 106 is configured to encapsulate the first packet to generate a second packet, where the second packet includes an identifier of the inbound interface.

The first sending circuit 108 is configured to send the second packet generated by the encapsulation circuit 106 to the second node.

Figure 2:
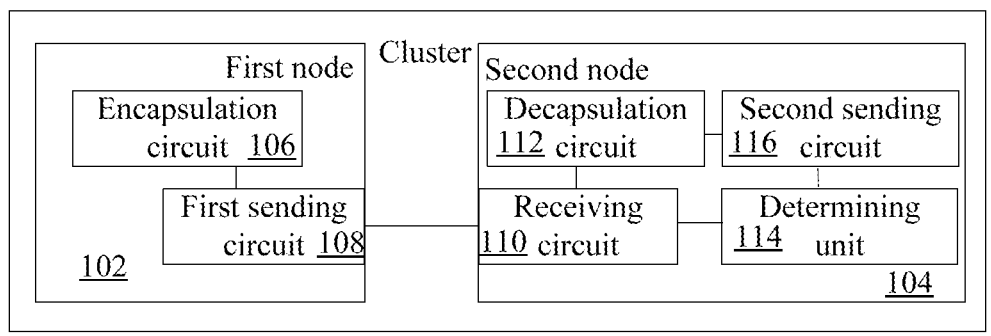
FIG. 2 is a schematic structural diagram of a cluster according to an embodiment of the present invention.

For the encapsulation circuit 106 and the first sending circuit 108, refer to FIG. 2 for details.

Optionally, the second packet may further include an identifier of the second node 104.

Optionally, in the cluster shown in FIG. 1, the second node 104 specifically includes a receiving circuit 110, a decapsulation circuit 112, a determining unit 114, and a second sending circuit 116.

The receiving circuit 110 is configured to receive the second packet sent from the first sending circuit 108.

The decapsulation circuit 112 is configured to decapsulate the second packet to generate the first packet.

The determining unit 114 is configured to determine a type of the forwarding service and the forwarding table according to the identifier of the inbound interface; determine a field in a packet header of the second packet according to the type of the forwarding service; and determine an identifier of the outbound interface according to the field and the forwarding table.

The second sending circuit 116 is configured to send, by using the outbound interface corresponding to the identifier of the outbound interface that is determined by the determining unit 114, the first packet generated by the decapsulation circuit 112.

For the receiving circuit 110, the decapsulation circuit 112, the determining unit 114, and the second sending circuit 116, refer to FIG. 2 for details.

For example, the determining unit 114 may be a network processor (network processor, NP) or a central processing unit (central processing unit, CPU) of the second node 104. The NP may be located in a forwarding plane of the second node 104. The CPU may be located in a control plane of the second node 104.

For example, the type of the forwarding service may be layer 2 forwarding, layer 3 forwarding, layer 4 forwarding, MPLS forwarding, or VPN forwarding.

For example, the determining the type of the forwarding service and the forwarding table according to the identifier of the inbound interface may be specifically using the identifier of the inbound interface as an index to access a linear table, so as to obtain a pointer used to point to a routing table. The pointer may be used to determine the type of the forwarding service as IP forwarding. The pointer may be used to determine the forwarding table as a routing table.

For example, the determining the field in the packet header of the second packet according to the type of the forwarding service may be: if the type of the forwarding service is IP forwarding and the second packet is an IP packet, determining a destination IP address in the packet header of the second packet. If the type of the forwarding service is MAC protocol forwarding and the second packet is a MAC protocol packet, a destination MAC protocol address in the packet header of the second packet is determined.

For example, the determining the identifier of the outbound interface according to the field and the forwarding table may be: if the field is a destination IP address and the forwarding table is a routing table, determining the identifier of the outbound interface according to the destination IP address and the routing table. If the field is a destination MAC protocol address and the forwarding table is a MAC protocol table, the identifier of the outbound interface is determined according to the destination MAC protocol address and the MAC protocol table.

Figure 3:
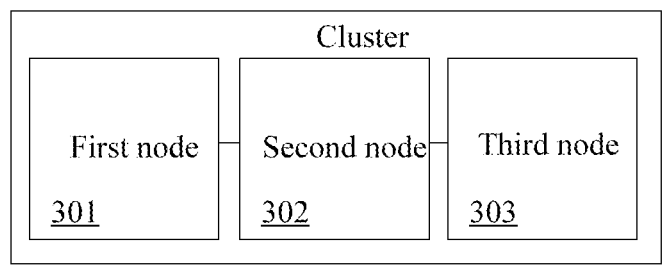
FIG. 3 is a schematic structural diagram of a cluster according to an embodiment of the present invention.

FIG. 3 is a schematic structural diagram of a cluster according to an embodiment of the present invention. Referring to FIG. 3, the cluster includes a first node 301, a second node 302, and a third node 303.

The first node 301, the second node 302, and the third node 303 are configured to cooperatively perform a forwarding service on a first packet, where the first node 301 is configured to receive the first packet by using an inbound interface and determine the inbound interface; the second node 302 is configured to determine the third node 303 and an outbound interface according to a forwarding table corresponding to the forwarding service; and the third node 303 is configured to forward the first packet by using the outbound interface of the third node 303.

For example, the first node 301 may be a router, a switch, a PTN device, a firewall, a BRAS, or a load balancer.

For example, the second node 302 may be a router, a switch, a PTN device, a firewall, a BRAS, or a load balancer.

For example, the third node 303 may be a router, a switch, a PTN device, a firewall, a BRAS, or a load balancer.

For example, the forwarding service may be a layer 2 forwarding service, a layer 3 forwarding service, a layer 4 forwarding service, an MPLS forwarding service, or a VPN forwarding service. The layer 2 forwarding service may be a MAC protocol forwarding service. The layer 3 forwarding service may be an IP forwarding service. The layer 4 forwarding service may be a TCP forwarding service. The VPN forwarding service may be an L2VPN forwarding service or an L3VPN forwarding service.

For example, the forwarding table may be a routing table or a MAC protocol table.

For example, the first packet may be a MAC protocol packet, an IP packet, a TCP packet, or a UDP packet.

For example, the determining the outbound interface according to the forwarding table may be specifically: if the first packet is an IP packet, determining, according to a destination IP address in the first packet, a routing entry that is in a routing table and matches the destination IP address. The routing entry includes an identifier of the outbound interface.

For example, the determining the outbound interface according to the forwarding table may be specifically: if the first packet is a MAC protocol packet, determining, according to a destination MAC protocol address in the first packet, a MAC protocol entry that is in a MAC protocol table and matches the destination MAC protocol address. The MAC protocol entry includes an identifier of the outbound interface.

In the foregoing technical solution, the second node determines the third node and the outbound interface. The third node forwards the first packet by using the outbound interface. Therefore, the first node and the third node do not need to maintain the forwarding table, nor need to determine the outbound interface by searching for the forwarding table. Maintaining the forwarding table and searching for the forwarding table need to occupy software and hardware resources. Therefore, the foregoing technical solution helps to reduce software and hardware resources occupied by the cluster.

Optionally, in the cluster shown in FIG. 3, the first node 301 further includes a first encapsulation circuit 304 and a first sending circuit 305.

The first encapsulation circuit 304 is configured to encapsulate the first packet to obtain a second packet, where the second packet includes an identifier of the inbound interface.

The first sending circuit 305 is configured to send the second packet generated by the first encapsulation circuit 304 to the second node 302.

Figure 4:
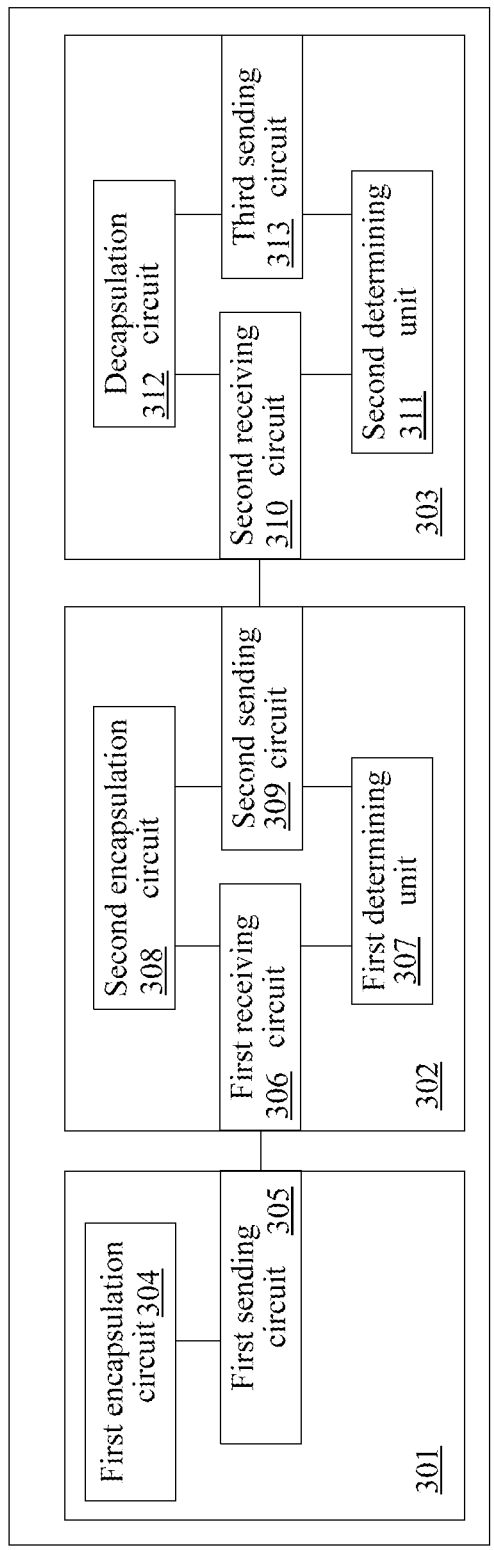
FIG. 4 is a schematic structural diagram of a cluster according to an embodiment of the present invention.

For the first encapsulation circuit 304 and the first sending circuit 305, refer to FIG. 4 for details.

Optionally, in the cluster shown in FIG. 3, the second node 302 specifically includes a first receiving circuit 306, a first determining unit 307, a second encapsulation circuit 308, and a second sending circuit 309.

The first receiving circuit 306 is configured to receive the second packet sent from the first sending circuit 305.

The first determining unit 307 is configured to determine a type of the forwarding service and the forwarding table according to the identifier of the inbound interface; determine a field in a packet header of the second packet according to the type of the forwarding service; and determine the third node and an identifier of the outbound interface according to the field and the forwarding table.

The second encapsulation circuit 308 is configured to encapsulate the first packet in the second packet to generate a third packet, where the third packet includes the identifier of the outbound interface.

The second sending circuit 309 is configured to send the third packet generated by the second encapsulation circuit 308 to the third node 303 determined by the first determining unit 307.

For example, the first determining unit 307 may be an NP or a CPU of the second node 302. The NP may be located in a forwarding plane of the second node 302. The CPU may be located in a control plane of the second node 302.

For example, the type of the forwarding service may be layer 2 forwarding, layer 3 forwarding, layer 4 forwarding, MPLS forwarding, or VPN forwarding.

For example, the determining the type of the forwarding service and the forwarding table according to the identifier of the inbound interface may be specifically: using the identifier of the inbound interface as an index to access a linear table, so as to obtain a pointer used to point to a routing table. The pointer may be used to determine the type of the forwarding service as IP forwarding. The pointer may be used to determine the forwarding table as a routing table.

For example, the determining the field in the packet header of the second packet according to the type of the forwarding service may be: if the type of the forwarding service is IP forwarding and the second packet is an IP packet, determining a destination IP address in the packet header of the second packet. If the type of the forwarding service is MAC protocol forwarding and the second packet is a MAC protocol packet, a destination MAC protocol address in the packet header of the second packet is determined.

For example, the determining the identifier of the outbound interface according to the field and the forwarding table may be: if the field is a destination IP address and the forwarding table is a routing table, determining the identifier of the outbound interface according to the destination IP address and the routing table. If the field is a destination MAC protocol address and the forwarding table is a MAC protocol table, the identifier of the outbound interface is determined according to the destination MAC protocol address and the MAC protocol table.

Optionally, the third packet may further include an identifier of the third node 303.

Optionally, in the cluster shown in FIG. 3, the third node 303 specifically includes a second receiving circuit 310, a second determining unit 311, a decapsulation circuit 312, and a third sending circuit 313.

The second receiving circuit 310 is configured to receive the third packet sent from the second sending circuit 309.

The decapsulation circuit 312 is configured to decapsulate the third packet to generate the first packet.

The second determining unit 311 is configured to determine the outbound interface according to the identifier of the outbound interface that is in the third packet received by the second receiving circuit 310.

The third sending circuit 313 is configured to send, by using the outbound interface determined by the second determining unit 311, the first packet generated by the decapsulation circuit 312.

For example, the second determining unit 311 may be an NP or a CPU of the third node 303. The NP may be located in a forwarding plane of the third node 303. The CPU may be located in a control plane of the third node 303.

Figure 5:
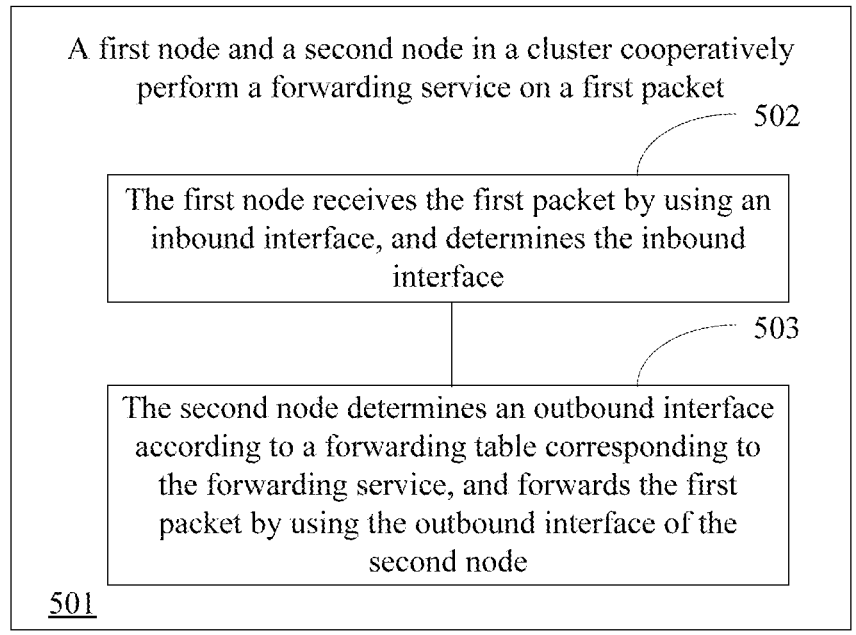
FIG. 5 is a schematic flowchart of a forwarding method according to an embodiment of the present invention.

FIG. 5 is a schematic flowchart of a forwarding method according to an embodiment of the present invention. The cluster shown in FIG. 1 may be used to perform the method shown in FIG. 5. Referring to FIG. 5, the method includes:

501. A first node and a second node in a cluster cooperatively perform a forwarding service on a first packet.

Step 501 specifically includes:

502. The first node receives the first packet by using an inbound interface and determines the inbound interface.

503. The second node determines an outbound interface according to a forwarding table corresponding to the forwarding service and forwards the first packet by using the outbound interface of the second node.

For example, the first node may be a router, a switch, a PTN device, a firewall, a BRAS, or a load balancer.

For example, the second node may be a router, a switch, a PTN device, a firewall, a BRAS, or a load balancer.

For example, the forwarding service may be a layer 2 forwarding service, a layer 3 forwarding service, a layer 4 forwarding service, an MPLS forwarding service, or a VPN forwarding service. The layer 2 forwarding service may be a MAC protocol forwarding service. The layer 3 forwarding service may be an IP forwarding service. The layer 4 forwarding service may be a TCP forwarding service. The VPN forwarding service may be an L2VPN forwarding service or an L3VPN forwarding service.

For example, the forwarding table may be a routing table or a MAC protocol table.

For example, the first packet may be a MAC protocol packet, an IP packet, a TCP packet, or a UDP packet.

For example, the determining the outbound interface according to the forwarding table may be specifically: if the first packet is an IP packet, determining, according to a destination IP address in the first packet, a routing entry that is in a routing table and matches the destination IP address. The routing entry includes an identifier of the outbound interface.

For example, the determining the outbound interface according to the forwarding table may be specifically: if the first packet is a MAC protocol packet, determining, according to a destination MAC protocol address in the first packet, a MAC protocol entry that is in a MAC protocol table and matches the destination MAC protocol address. The MAC protocol entry includes an identifier of the outbound interface.

In the foregoing technical solution, the second node determines the outbound interface and forwards the first packet by using the outbound interface. Therefore, the first node does not need to maintain the forwarding table, nor need to determine the outbound interface by searching for the forwarding table. Maintaining the forwarding table and searching for the forwarding table need to occupy software and hardware resources. Therefore, the foregoing technical solution helps to reduce software and hardware resources occupied by the cluster.

Optionally, in the method shown in FIG. 5, after the first node determines the inbound interface, the method further includes:

504. The first node encapsulates the first packet to generate a second packet, where the second packet includes an identifier of the inbound interface.
505. The first node sends the second packet to the second node.

Figure 6:
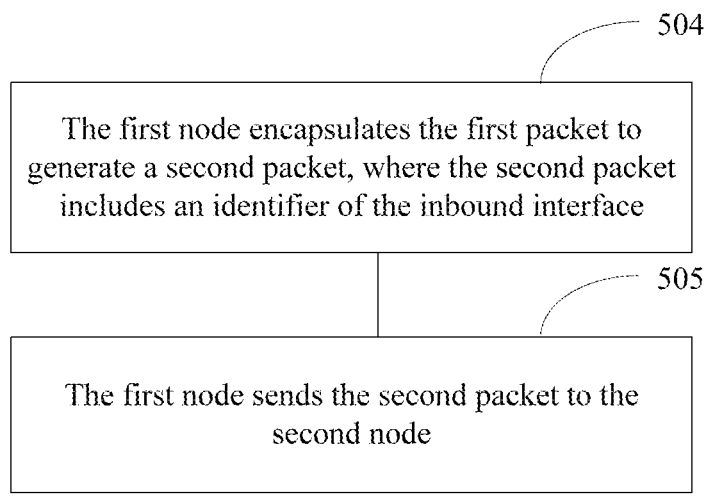
FIG. 6 is a schematic flowchart of a forwarding method according to an embodiment of the present invention.

For step 504 and step 505, refer to FIG. 6 for details.

Optionally, in the method shown in FIG. 5, the determining the outbound interface by the second node specifically includes:

506. The second node receives the second packet sent from the first node.
507. The second node decapsulates the second packet to generate the first packet.
508. The second node determines a type of the forwarding service and the forwarding table according to the identifier of the inbound interface, determines a field in a packet header of the second packet according to the type of the forwarding service, and determines an identifier of the outbound interface according to the field and the forwarding table.

The forwarding the first packet by the second node specifically includes:

sending, by the second node, the first packet by using the outbound interface corresponding to the identifier of the outbound interface.

Figure 7:
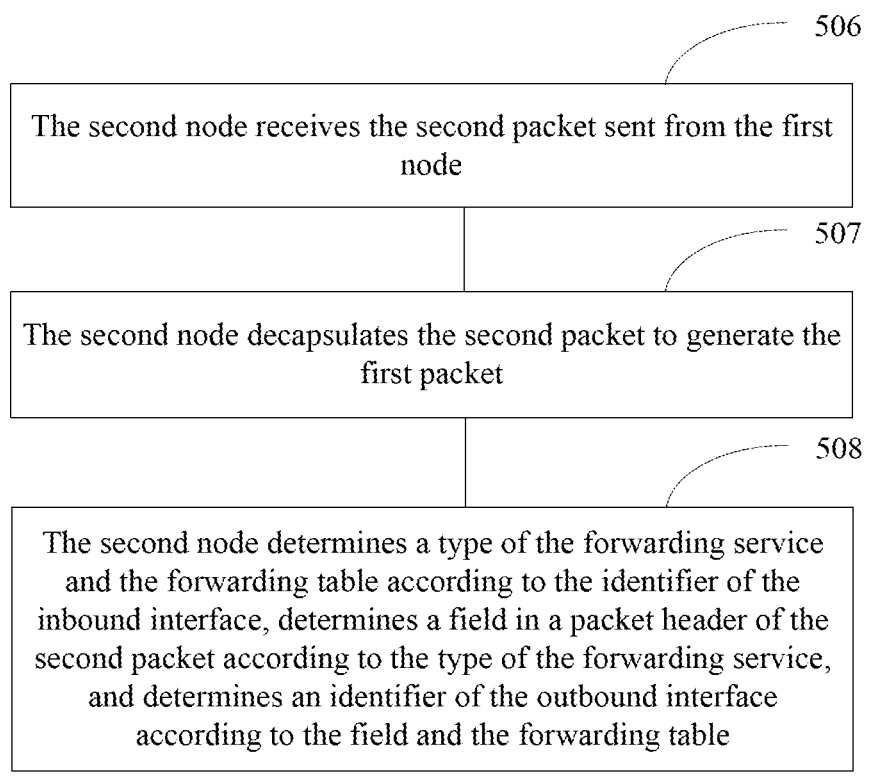
FIG. 7 is a schematic flowchart of a forwarding method according to an embodiment of the present invention.

For step 506, step 507, and step 508, refer to FIG. 7 for details.

For example, step 508 may be performed by an NP or a CPU of the second node. The NP may be located in a forwarding plane of the second node. The CPU may be located in a control plane of the second node.

For example, the type of the forwarding service may be layer 2 forwarding, layer 3 forwarding, layer 4 forwarding, MPLS forwarding, or VPN forwarding.

For example, the determining the type of the forwarding service and the forwarding table according to the identifier of the inbound interface may be specifically: using the identifier of the inbound interface as an index to access a linear table, so as to obtain a pointer used to point to a routing table. The pointer may be used to determine the type of the forwarding service as IP forwarding. The pointer may be used to determine the forwarding table as a routing table.

For example, the determining the field in the packet header of the second packet according to the type of the forwarding service may be: if the type of the forwarding service is IP forwarding and the second packet is an IP packet, determining a destination IP address in the packet header of the second packet. If the type of the forwarding service is MAC protocol forwarding and the second packet is a MAC protocol packet, a destination MAC protocol address in the packet header of the second packet is determined.

For example, the determining the identifier of the outbound interface according to the field and the forwarding table may be: if the field is a destination IP address and the forwarding table is a routing table, determining the identifier of the outbound interface according to the destination IP address and the routing table. If the field is a destination MAC protocol address and the forwarding table is a MAC protocol table, the identifier of the outbound interface is determined according to the destination MAC protocol address and the MAC protocol table.

Figure 8:
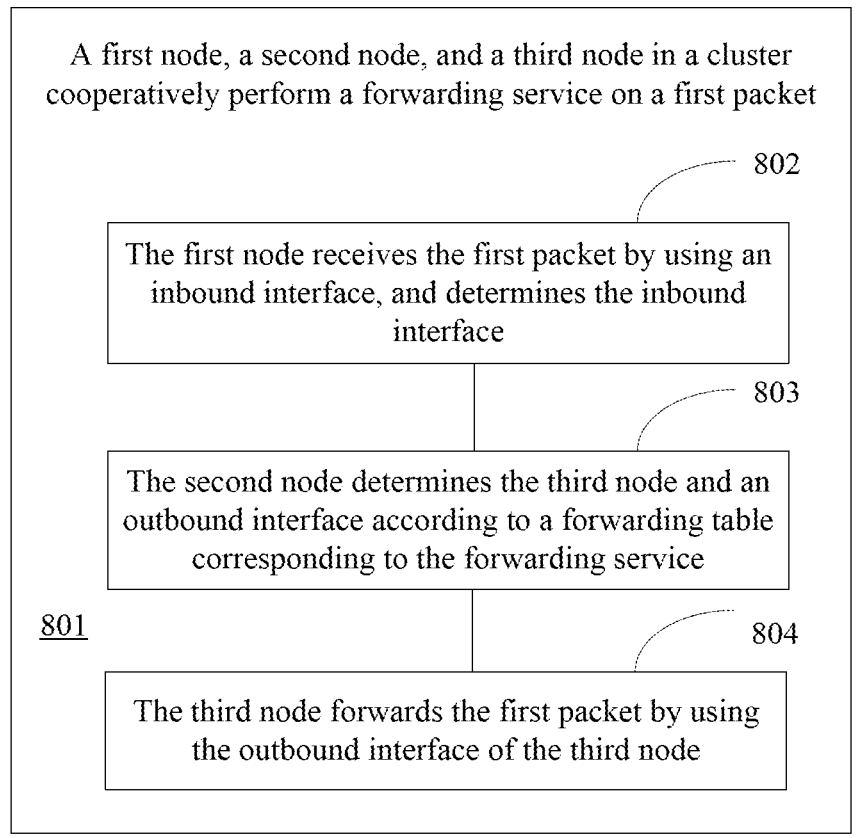
FIG. 8 is a schematic flowchart of a forwarding method according to an embodiment of the present invention.

FIG. 8 is a schematic flowchart of a forwarding method according to an embodiment of the present invention. The cluster shown in FIG. 3 may be used to perform the method shown in FIG. 8. Referring to FIG. 8, the method includes:

801. A first node, a second node, and a third node in a cluster cooperatively perform a forwarding service on a first packet.

Step 801 specifically includes:

802. The first node receives the first packet by using an inbound interface and determines the inbound interface.
803. The second node determines the third node and an outbound interface according to a forwarding table corresponding to the forwarding service.
804. The third node forwards the first packet by using the outbound interface of the third node.

For example, the first node may be a router, a switch, a PTN device, a firewall, a BRAS, or a load balancer.

For example, the second node may be a router, a switch, a PTN device, a firewall, a BRAS, or a load balancer.

For example, the third node may be a router, a switch, a PTN device, a firewall, a BRAS, or a load balancer.

For example, the forwarding service may be a layer 2 forwarding service, a layer 3 forwarding service, a layer 4 forwarding service, an MPLS forwarding service, or a VPN forwarding service. The layer 2 forwarding service may be a MAC protocol forwarding service. The layer 3 forwarding service may be an IP forwarding service. The layer 4 forwarding service may be a TCP forwarding service. The VPN forwarding service may be an L2VPN forwarding service or an L3VPN forwarding service.

For example, the forwarding table may be a routing table or a MAC protocol table.

For example, the first packet may be a MAC protocol packet, an IP packet, a TCP packet, or a UDP packet.

For example, the determining the outbound interface according to the forwarding table may be specifically: if the first packet is an IP packet, determining, according to a destination IP address in the first packet, a routing entry that is in a routing table and matches the destination IP address. The routing entry includes an identifier of the outbound interface.

For example, the determining the outbound interface according to the forwarding table may be specifically: if the first packet is a MAC protocol packet, determining, according to a destination MAC protocol address in the first packet, a MAC protocol entry that is in a MAC protocol table and matches the destination MAC protocol address. The MAC protocol entry includes an identifier of the outbound interface.

In the foregoing technical solution, the second node determines the third node and the outbound interface. The third node forwards the first packet by using the outbound interface. Therefore, the first node and the third node do not need to maintain the forwarding table, nor need to determine the outbound interface by searching for the forwarding table. Maintaining the forwarding table and searching for the forwarding table need to occupy software and hardware resources. Therefore, the foregoing technical solution helps to reduce software and hardware resources occupied by the cluster.

Optionally, in the method shown in FIG. 8, after the first node determines the inbound interface, the method further includes:

805. The first node encapsulates the first packet to obtain a second packet, where the second packet includes an identifier of the inbound interface.
806. The first node sends the second packet to the second node.

Figure 9:
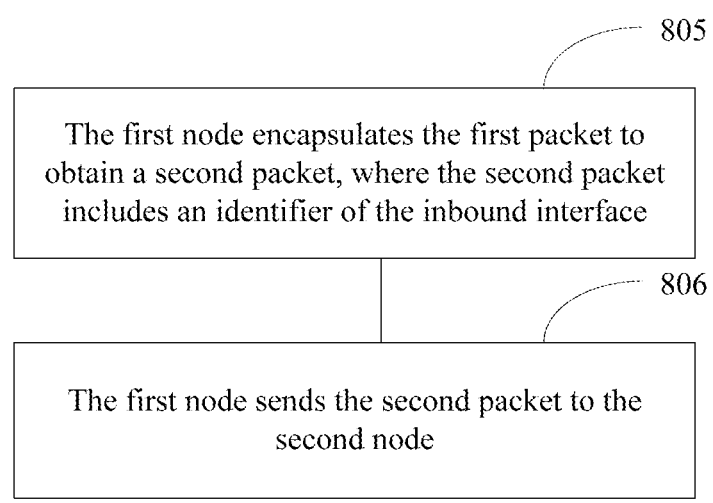
FIG. 9 is a schematic flowchart of a forwarding method according to an embodiment of the present invention.

For step 805 and step 806, refer to FIG. 9 for details.

Optionally, in the method shown in FIG. 8, the determining the third node and the outbound interface by the second node specifically includes:

807. The second node receives the second packet.
808. The second node determines a type of the forwarding service and the forwarding table according to the identifier of the inbound interface, determines a field in a packet header of the second packet according to the type of the forwarding service, and determines the third node and an identifier of the outbound interface according to the field and the forwarding table.
809. The second node encapsulates the first packet in the second packet to generate a third packet, where the third packet includes the identifier of the outbound interface.
810. The second node sends the third packet to the third node.

Figure 10:
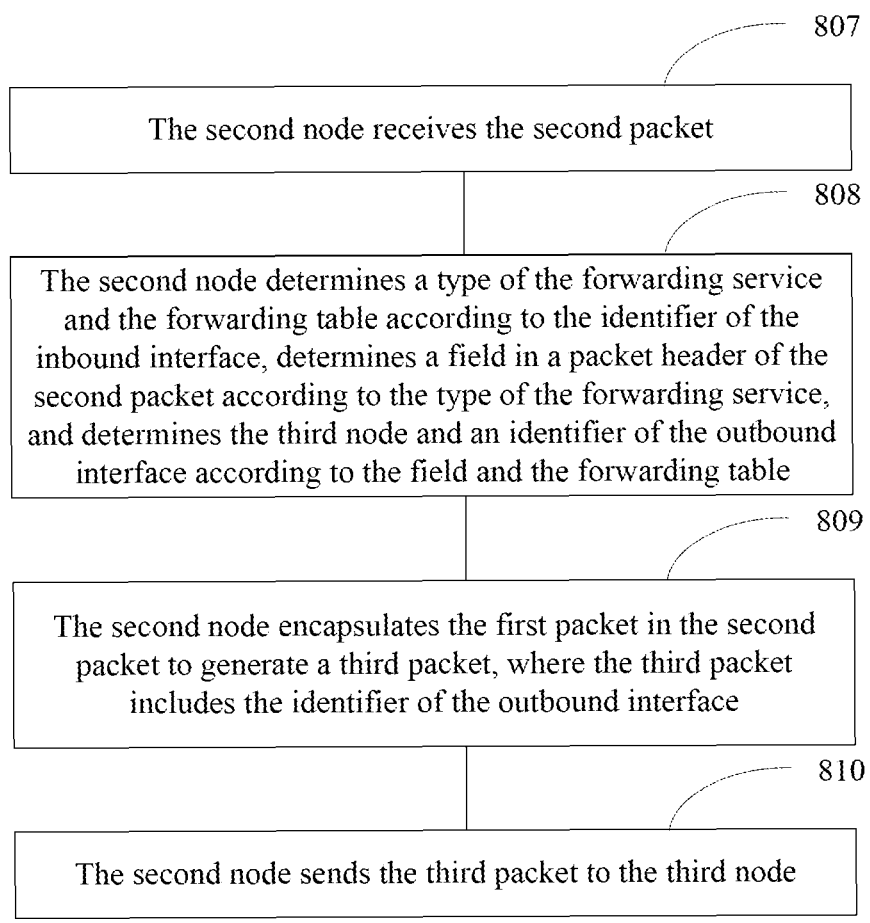
FIG. 10 is a schematic flowchart of a forwarding method according to an embodiment of the present invention.

For step 807, step 808, step 809, and step 810, refer to FIG. 10 for details.

For example, step 808 may be performed by an NP or a CPU of the second node. The NP may be located in a forwarding plane of the second node. The CPU may be located in a control plane of the second node.

For example, the type of the forwarding service may be layer 2 forwarding, layer 3 forwarding, layer 4 forwarding, MPLS forwarding, or VPN forwarding.

For example, the determining the type of the forwarding service and the forwarding table according to the identifier of the inbound interface may be specifically: using the identifier of the inbound interface as an index to access a linear table, so as to obtain a pointer used to point to a routing table. The pointer may be used to determine the type of the forwarding service as IP forwarding. The pointer may be used to determine the forwarding table as a routing table.

For example, the determining the field in the packet header of the second packet according to the type of the forwarding service may be: if the type of the forwarding service is IP forwarding and the second packet is an IP packet, determining a destination IP address in the packet header of the second packet. If the type of the forwarding service is MAC protocol forwarding and the second packet is a MAC protocol packet, a destination MAC protocol address in the packet header of the second packet is determined.

For example, the determining the identifier of the outbound interface according to the field and the forwarding table may be: if the field is a destination IP address and the forwarding table is a routing table, determining the identifier of the outbound interface according to the destination IP address and the routing table. If the field is a destination MAC protocol address and the forwarding table is a MAC protocol table, the identifier of the outbound interface is determined according to the destination MAC protocol address and the MAC protocol table.

Optionally, in the method shown in FIG. 8, the forwarding the first packet by the third node specifically includes:

811. The third node receives the third packet.
812. The third node decapsulates the third packet to generate the first packet.
813. The third node determines the outbound interface according to the identifier of the outbound interface that is in the third packet.
814. The third node sends the first packet by using the outbound interface.

Figure 11:
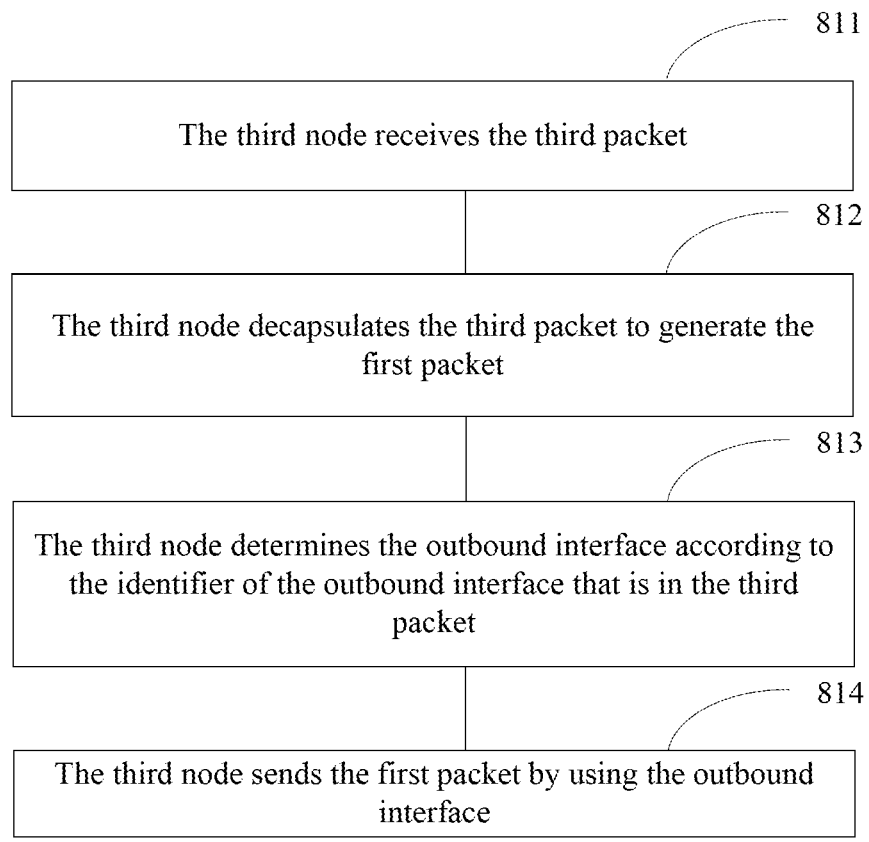
FIG. 11 is a schematic flowchart of a forwarding method according to an embodiment of the present invention.

For step 811, step 812, step 813, and step 814, refer to FIG. 11 for details.

For example, step 813 may be performed by an NP or a CPU of the third node. The NP may be located in a forwarding plane of the third node. The CPU may be located in a control plane of the third node 303.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A cluster comprising:
a first node and a second node, wherein the first node and the second node are configured to cooperatively perform a forwarding service on a first packet, wherein the first node is configured to receive the first packet by using an inbound interface and determine the inbound interface, and wherein the second node is configured to determine an outbound interface and forward the first packet by using the outbound interface of the second node, the outbound interface being determined by the second node according to a forwarding table that is identified by an identifier of the inbound interface and that is corresponding to the forwarding service.

2. The cluster according to claim 1, wherein:
the first node further comprises an encapsulation circuit and a first sending circuit, wherein:
the encapsulation circuit is configured to encapsulate the first packet to generate a second packet, wherein the second packet comprises the identifier of the inbound interface; and
the first sending circuit is configured to send the second packet generated by the encapsulation circuit to the second node.

3. The cluster according to claim 1, wherein:
the second node specifically comprises a receiving circuit, a decapsulation circuit, a determining unit, and a second sending circuit, wherein:
the receiving circuit is configured to receive a second packet sent from a first sending circuit;
the decapsulation circuit is configured to decapsulate the second packet to generate the first packet;
the determining unit is configured to determine a type of the forwarding service and the forwarding table according to an identifier of the inbound interface; determine a field in a packet header of the second packet according to the type of the forwarding service; and determine an identifier of the outbound interface according to the field and the forwarding table; and
the second sending circuit is configured to send, by using the outbound interface corresponding to the identifier of the outbound interface that is determined by the determining unit, the first packet generated by the decapsulation circuit.

4. A cluster comprising:
a first node, a second node, and a third node,
wherein the first node, the second node, and the third node are configured to cooperatively perform a forwarding service on a first packet,
wherein the first node is configured to receive the first packet by using an inbound interface and determine the inbound interface,
wherein the second node is configured to determine the third node and an outbound interface of the third node, the outbound interface being determined according to a forwarding table that is identified by an identifier of the inbound interface and that is corresponding to the forwarding service, and
wherein the third node is configured to forward the first packet by using the outbound interface of the third node.

5. The cluster according to claim 4, wherein the first node further comprises a first encapsulation circuit and a first sending circuit, wherein:
the first encapsulation circuit is configured to encapsulate the first packet to obtain a second packet, wherein the second packet comprises the identifier of the inbound interface; and
the first sending circuit is configured to send the second packet generated by the first encapsulation circuit to the second node.

6. The cluster according to claim 4, wherein the second node specifically comprises a first receiving circuit, a first determining unit, a second encapsulation circuit, and a second sending circuit,
wherein:
the first receiving circuit is configured to receive a second packet sent from a first sending circuit;
the first determining unit is configured to determine a type of the forwarding service and the forwarding table according to the identifier of the inbound interface; determine a field in a packet header of the second packet according to the type of the forwarding service; and determine the third node and an identifier of the outbound interface according to the field and the forwarding table;
the second encapsulation circuit is configured to encapsulate the first packet in the second packet to generate a third packet, wherein the third packet comprises the identifier of the outbound interface; and
the second sending circuit is configured to send the third packet generated by the second encapsulation circuit to the third node determined by the first determining unit.

7. The cluster according to claim 6, wherein:
the third node specifically comprises a second receiving circuit, a second determining unit, a decapsulation circuit, and a third sending circuit, wherein:
the second receiving circuit is configured to receive the third packet sent from the second sending circuit;
the decapsulation circuit is configured to decapsulate the third packet to generate the first packet;
the second determining unit is configured to determine the outbound interface according to the identifier of the outbound interface that is in the third packet received by the second receiving circuit; and
the third sending circuit is configured to send, by using the outbound interface determined by the second determining unit, the first packet generated by the decapsulation circuit.

8. A forwarding method comprising:
cooperatively performing, by a first node and a second node in a cluster, a forwarding service on a first packet,
wherein the first node receives the first packet by using an inbound interface and determines the inbound interface, and
wherein the second node determines an outbound interface based on an identifier of the outbound interface, and forwards the first packet by using the outbound interface of the second node, the identifier of the outbound interface being determined by the second node according to a destination address of the first packet and a forwarding table that is identified by an identifier of the inbound interface, and the forwarding table corresponding to the forwarding service.

9. The method according to claim 8, wherein after the first node determines the inbound interface, the method further comprises:
    encapsulating, by the first node, the first packet to generate a second packet, wherein the second packet comprises the identifier of the inbound interface; and
    sending, by the first node, the second packet to the second node.

10. The method according to claim 8, wherein:
the outbound interface is identified by:
    receiving, by the second node, a second packet sent from the first node;
    decapsulating, by the second node, the second packet to generate the first packet; and
    determining, by the second node, a type of the forwarding service and the forwarding table according to the identifier of the inbound interface, determining a field in a packet header of the second packet according to the type of the forwarding service, and determining the identifier of the outbound interface according to the field and the forwarding table; and
the first packet is forwarded by:
    sending, by the second node, the first packet by using the outbound interface corresponding to the identifier of the outbound interface.

11. A forwarding method comprising:
cooperatively performing, by a first node, a second node, and a third node in a cluster, a forwarding service on a first packet,
wherein the first node receives the first packet by using an inbound interface and determines the inbound interface,
wherein the second node determines the third node and an outbound interface of the third node based on an identifier of the outbound interface and destination address information of the first packet, the identifier of the outbound interface being determined according to a forwarding table that is identified by an identifier of the inbound interface and that is corresponding to the forwarding service, and
wherein the third node forwards the first packet by using the outbound interface of the third node.

12. The method according to claim 11, wherein after the first node determines the inbound interface, the method further comprises:
    encapsulating, by the first node, the first packet to obtain a second packet, wherein the second packet comprises the identifier of the inbound interface; and
    sending, by the first node, the second packet to the second node.

13. The method according to claim 11, wherein the third node and the outbound interface are determined by:
    receiving a second packet by the second node;
    determining, by the second node, a type of the forwarding service and the forwarding table according to the identifier of the inbound interface, determining a field in a packet header of the second packet according to the type of the forwarding service, and determining the third node and the identifier of the outbound interface according to the field and the forwarding table;
    encapsulating, by the second node, the first packet in the second packet to generate a third packet, wherein the third packet comprises the identifier of the outbound interface; and
    sending, by the second node, the third packet to the third node.

14. The method according to claim 13, wherein the third node forwards the first packet by:
    receiving the third packet by the third node;
    decapsulating, by the third node, the third packet to generate the first packet;
    determining, by the third node, the outbound interface according to the identifier of the outbound interface that is in the third packet; and
    sending, by the third node, the first packet by using the outbound interface.

* * * * *